(12) United States Patent
Sambonet

(10) Patent No.: US 9,307,866 B2
(45) Date of Patent: Apr. 12, 2016

(54) CHAFING DISH FOR WARMING DISHES WITH CONTROLLED HUMIDITY

(75) Inventor: Sergio Sambonet, Milan (IT)

(73) Assignee: LA TAVOLA S.R.L., Vercelli (IT)

( * ) Notice: Subject to any disclaimer, the term of this patent is extended or adjusted under 35 U.S.C. 154(b) by 322 days.

(21) Appl. No.: 13/995,447

(22) PCT Filed: Dec. 19, 2011

(86) PCT No.: PCT/IB2011/055790
§ 371 (c)(1),
(2), (4) Date: Jul. 30, 2013

(87) PCT Pub. No.: WO2012/085826
PCT Pub. Date: Jun. 28, 2012

(65) Prior Publication Data
US 2013/0298782 A1    Nov. 14, 2013

(30) Foreign Application Priority Data

Dec. 20, 2010  (IT) .............................. MI2011U0337
Oct. 20, 2011  (IT) .............................. MI2010U0377

(51) Int. Cl.
*A47J 36/00* (2006.01)
*A47J 39/02* (2006.01)
(Continued)

(52) U.S. Cl.
CPC *A47J 39/02* (2013.01); *A47J 27/04* (2013.01); *A47J 36/24* (2013.01); *A47J 36/2405* (2013.01); *A47J 36/2483* (2013.01); *A47J 36/30* (2013.01)

(58) Field of Classification Search
CPC ..... A47J 27/04; A47J 2027/043; A47J 36/30; A47J 36/2483

USPC ......... 99/410, 413, 417, 483; 126/377.1, 369; 220/573.1, 573, 4, 574.2, 506
See application file for complete search history.

(56) References Cited

U.S. PATENT DOCUMENTS 1,480,505 A    1/1924  Hutchison
2,607,338 A *  8/1952  Parenti ........................ 126/385.1
(Continued)

FOREIGN PATENT DOCUMENTS

DE    4119688 C1    4/1992
FR    2484614 A1    12/1981
(Continued)

OTHER PUBLICATIONS

International Search Report PCT/IB2011/055790 Dated Mar. 30, 2012.

*Primary Examiner* — Reginald L Alexander
(74) *Attorney, Agent, or Firm* — Hedman & Costigan, P.C.; James V. Costigan; Kathleen A. Costigan

(57) ABSTRACT

Tray (10, 10') for a chafing dish (100) of the type comprising a base (11, 11') for coupling to a heat source (101, 102, 103), side containment walls (12, 12') and an upper opening (13, 13') for directly receiving dishes or a further dish tray (104), characterized in that said tray (10, 10') comprises at least two independent areas (16, 16', 17) for containing water (15) which can be selectively filled so as to selectively allow a high humidity warming, should both said at least two areas (16, 16', 17) be filled with water (15), a controlled humidity warming, should at least one of said at least two areas (16, 16', 17) be not provided with water (15), and a dry warming, should both said at least two areas (16, 16', 17) be not provided with water (15).

9 Claims, 8 Drawing Sheets

(51) Int. Cl.
  *A47J 36/24* (2006.01)
  *A47J 36/30* (2006.01)
  *A47J 27/04* (2006.01)

(56) References Cited

U.S. PATENT DOCUMENTS 4,509,412 A * 4/1985 Whittenburg et al. .......... 99/331
5,119,800 A * 6/1992 Roberts et al. ............. 126/378.1
5,400,701 A * 3/1995 Sham ............... 99/410
6,125,738 A * 10/2000 Poister ............ 99/339

FOREIGN PATENT DOCUMENTS

NL       40258 C      3/1937
WO    02/051289 A1   7/2002

* cited by examiner

CHAFING DISH FOR WARMING DISHES WITH CONTROLLED HUMIDITY

The present invention refers to a chafing dish for warming dishes with controlled humidity.

Various types of chafing dishes, used in the hotel and catering industry generally with the aim of warming or keeping food products previously prepared and intended for consumption warm, are currently known.

Such known devices comprise a dish tray, in which food products are arranged, a water holding vat and a heat source in which the water holding vat is provided with a base for being coupled to the heat source, side walls for containing water and an upper opening for receiving the dish tray.

As observable from what is indicated above, the type of food warming allowed by such devices is of the indirect or mediated type known by the term "bain-marie", where the dish tray is at least partly submerged in the water holding vat to be filled with water and in direct contact with a heat source.

In particular, the presence of water as heat transmission element has the advantage of making the food warming homogeneous and long-lasting over time. However, such type of cooking is not suitable for all the possible dishes intended for consumption which, actually, due to the high humidity generated by the amount of water present in the water holding vat, may have excessive humidity content and thus not corresponding to the taste required by the consumers.

An object of the present invention is to provide a chafing dish for warming dishes at controlled humidity which, alternatively to the known devices, allow for, without removing or replacing any component, selectively warming the dishes in "bain-marie", i.e. in a high humidity environment, in a controlled humidity environment or in a low humidity environment, with the aim of being able to provide dishes with taste and consistency corresponding to those required by consumers.

This object, according to the present invention, is attained by making a chafing dish for warming dishes with controlled humidity as outlined in the claims.

Further characteristics of the invention are outlined by the dependent claims.

Characteristics and advantages of a chafing dish for warming dishes with controlled humidity according to the present invention will be more apparent from the following exemplifying and non-limiting description with reference to the attached schematic drawings wherein.

With reference to the figures, example embodiments of trays for a chafing dish according to the present invention are indicated with 10 and 10' the relative chafing dish provided with such trays 10, 10' are indicated with 100.

As better observable in detail hereinafter such tray 10, 10' will be able to be used as a water holding vat 10 which can be associated to a further dish tray 104, or which can be directly used as a dish holder tray 10'.

Figure 1:
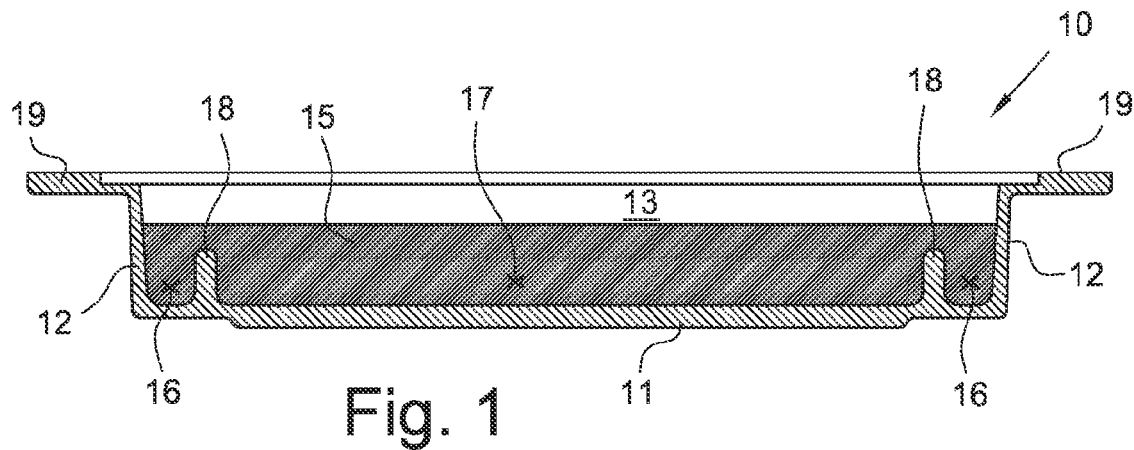
FIGS. 1-3 show—in sectional view—an example embodiment of an improved dish tray according to the present invention in three different possible applications to selectively obtain a warming in a high humidity environment, in a controlled humidity environment and in a low humidity environment.
Figure 2:
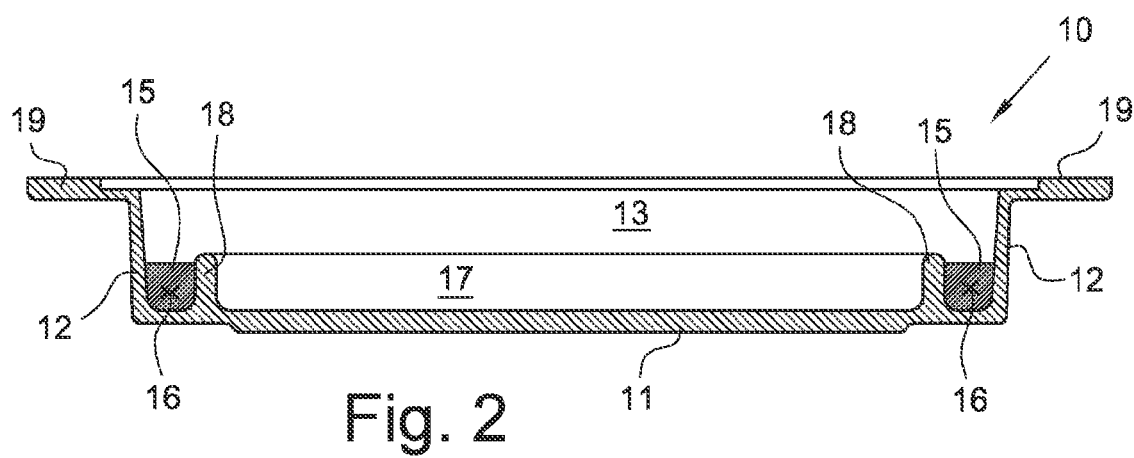
Figure 3:
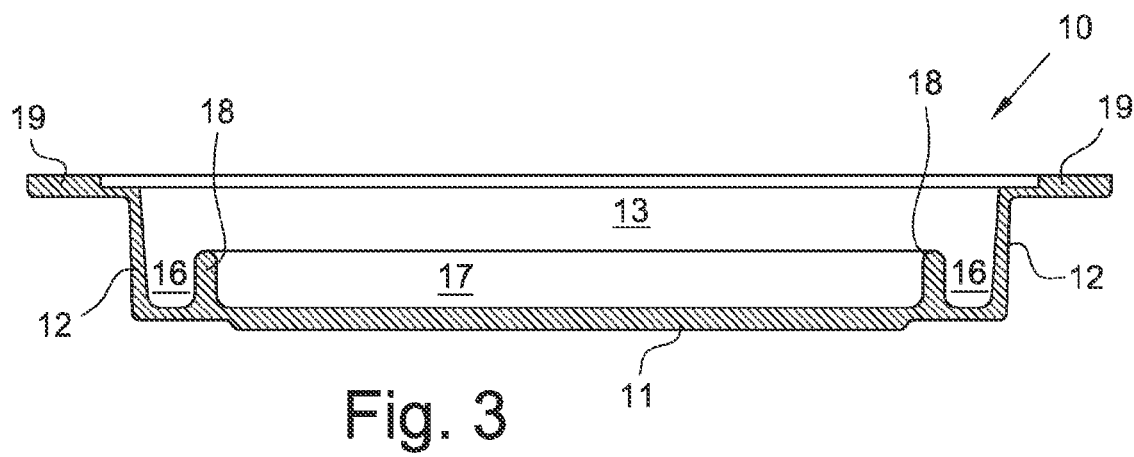

In FIGS. 1-3 the tray 10, 10' for a chafing dish 100 according to the present invention is of the type comprising a base 11, 11' for coupling to a heat source 101, 102, 103, side containment walls 12, 12' and an upper opening 13, 13' for receiving a dish tray 104 or directly dishes according to the required use.

In particular, such tray 10, 10' comprises at least two areas 16, 16', 17 for containing water 15 which can be selectively filled and obtained on the base 11 towards the upper opening 13.

Figure 4:
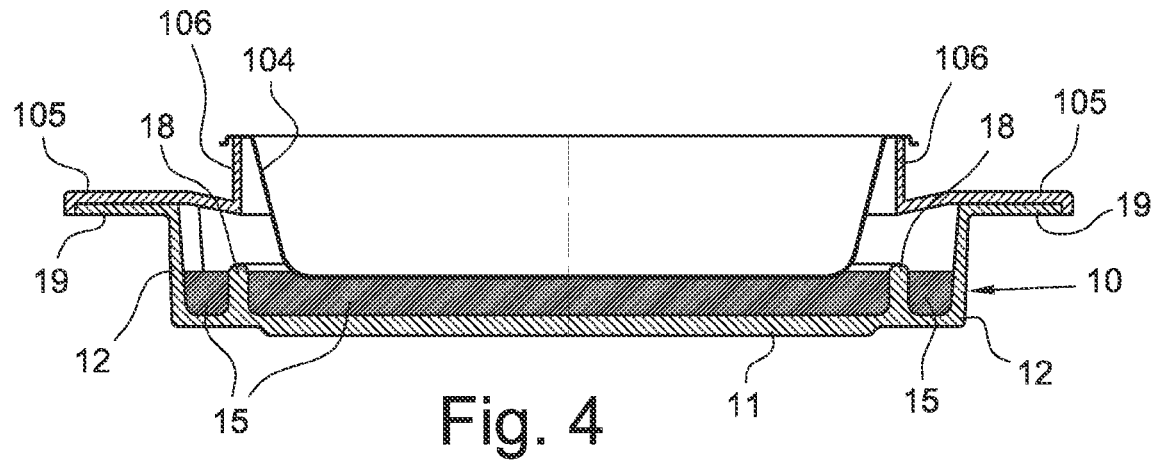
FIGS. 4-6 show a sectional view of the tray of the preceding figures associated to a dish tray in the three possible applications of FIGS. 1-3.
Figure 5:
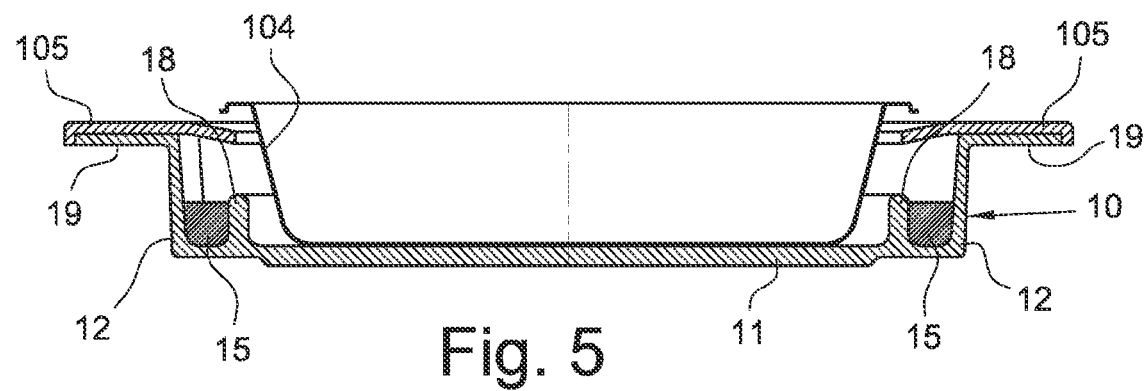
Figure 6:
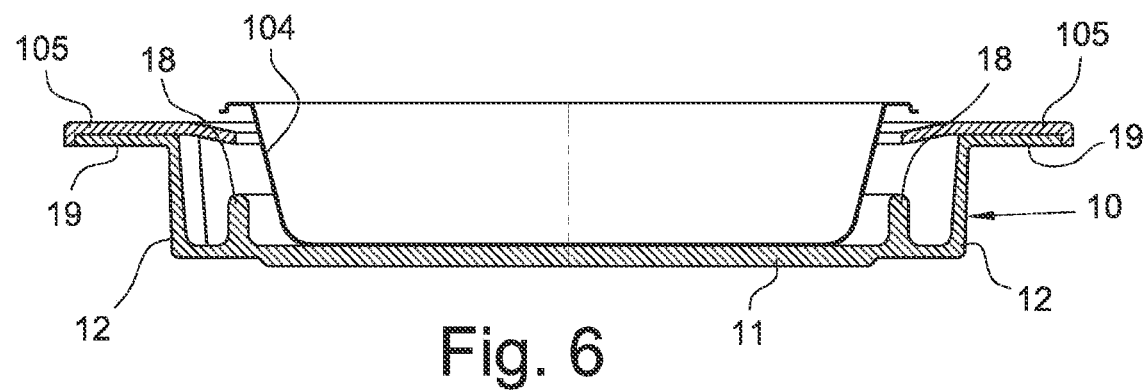
Figure 7:
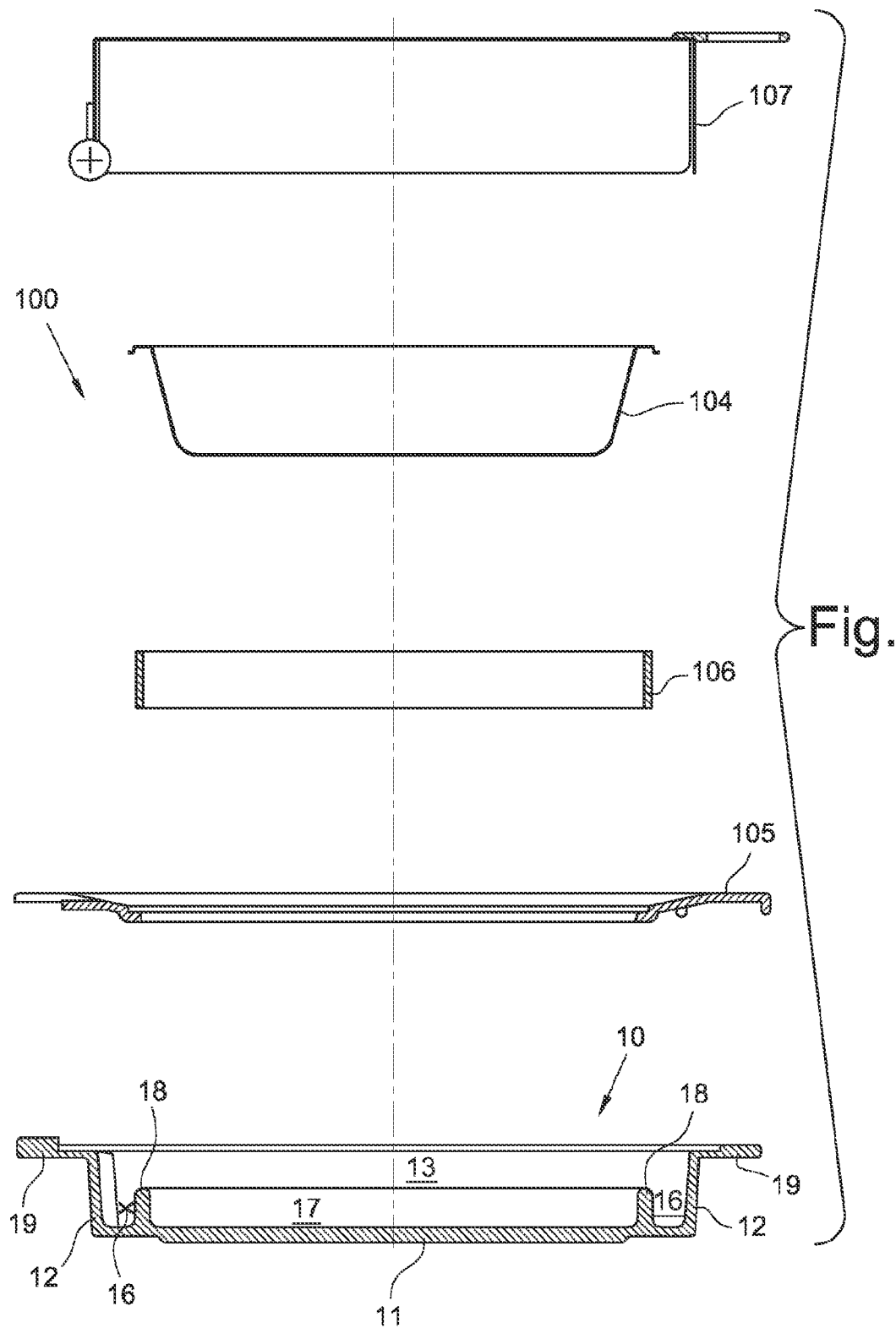
FIG. 7 shows an exploded view of a chafing dish provided with a tray of the preceding figures.

This allows for selectively performing three possible types of warming without removing or replacing any component, i.e. operate with a high humidity warming or in bain-marie, as shown in FIGS. 1 and 4 in which both the at least two areas 16, 17 are filled with water 15, with a controlled humidity warming, as shown in FIGS. 2 and 5 in which at least one 17 of the two areas 16, 17 is not provided with water 15, or with a dry warming, as shown in FIGS. 3 and 6 in which both the at least two areas 16, 17 are not provided with water 15.

In the embodiment shown in FIGS. 1-11, the at least two areas 16, 17 for containing water 15 are delimited by barrier elements 18 projecting and integral with the base 11 towards the upper opening 13.

Alternatively, such areas 16, 17 could be delimited by removable or variable geometry partitions depending on the requirements and the type of dish to be warmed.

As per se known, the tray 10, 10' may comprise peripheral extensions 19 substantially orthogonal to the side walls 12, 12' which serve as an element for coupling to an external structure for supporting the chafing dish 100, such as for example feet or a seat obtained on a resting plane.

The heat sources that can be associated to the tray 10, 10' according to the invention can be a common burner 101, electrical resistors 102 or an induction plate 103.

Figure 8:
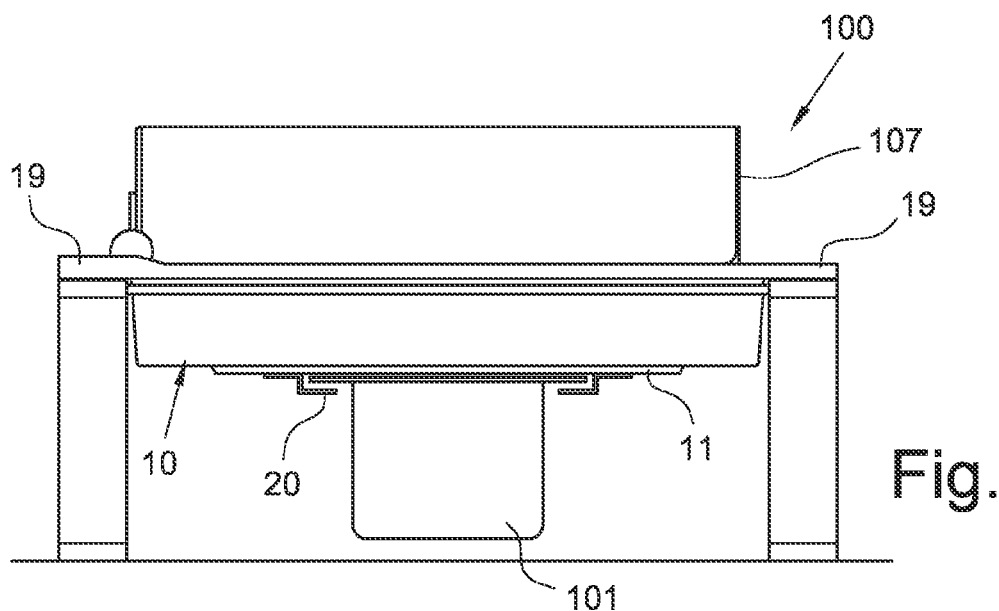
FIGS. 8-10 show an elevation view of the chafing dish of FIG. 7 associated to three different heat sources.
Figure 9:
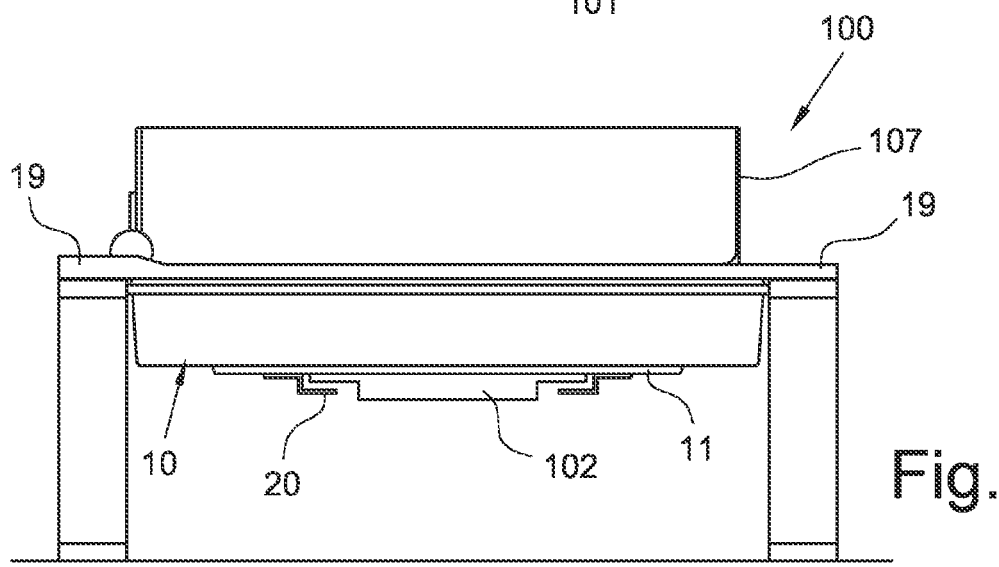
Figure 10:
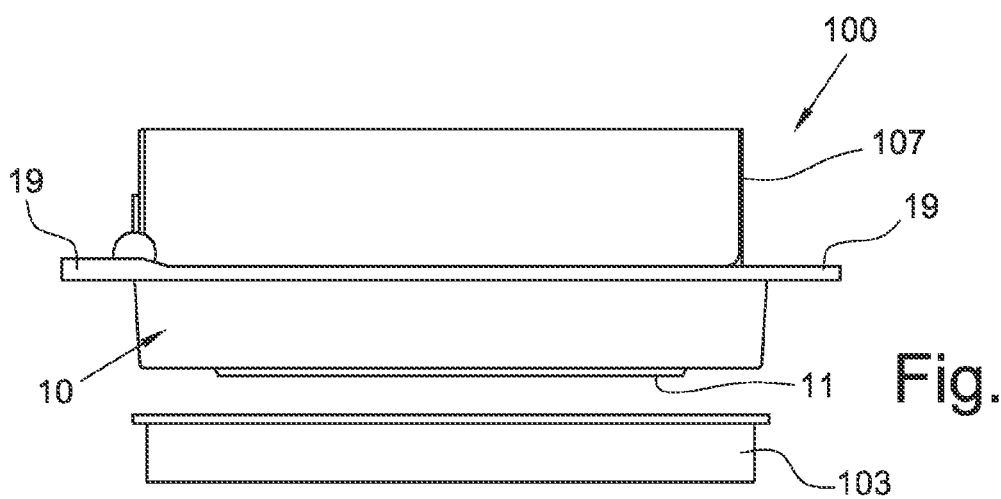

As shown in FIGS. 8-10, should the burner 101 or electric resistors 102 be present, a slide 20 obtained on the base 11 towards the external of the tray 10, 10' is provided, while should the warming be generated using an induction plate 103, the base 11 is externally coated with a high iron content layer.

The chafing dish 100 is completed by a connection element 105 arranged between the dish tray 104 and the tray 10, a connection element 105 shaped so as to convey possible condensed vapour towards the tray 10, 10', and a spacer element 106 which can be associated on one side to the connection element 105 and on the other side to the dish tray 104 for maintaining the dish tray 104 in a suspended position with respect to the tray 10.

Such spacer element 106, as observable in FIG. 2, is particularly suitable for high humidity bain-marie cooking.

Obviously, a cover 107 is provided for closing the chafing dish 100.

Figure 11:
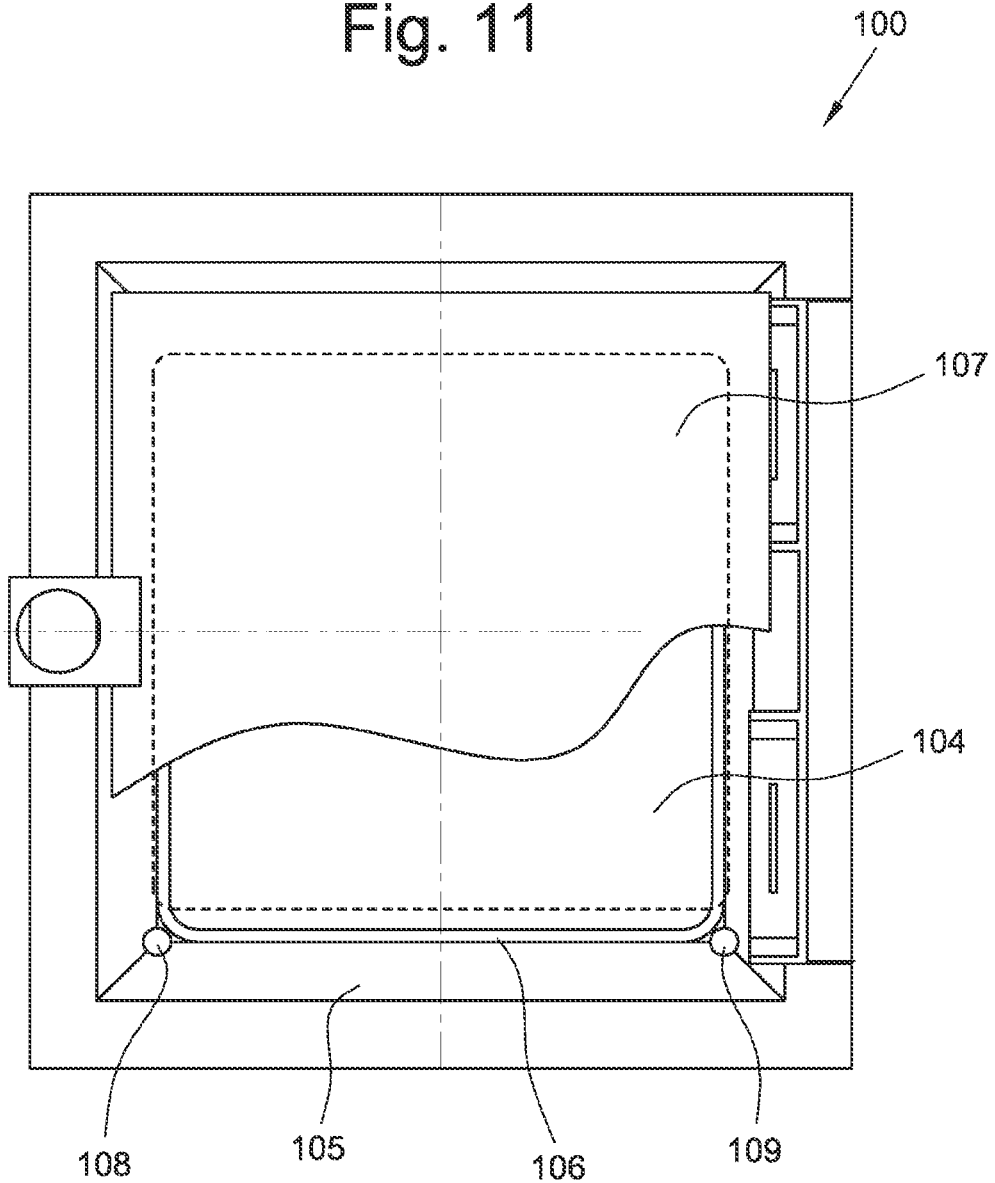
FIG. 11 shows a partly cutaway top view of a chafing dish according to the present invention.
Figure 12:
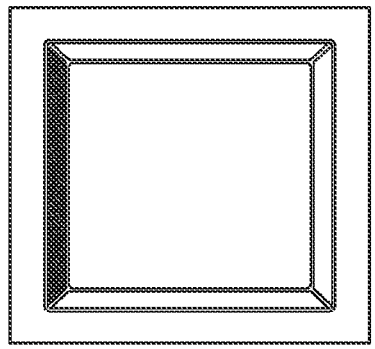
FIGS. 12-17 show a preferred embodiment of the tray according to the present invention in different use configurations.
Figure 13:
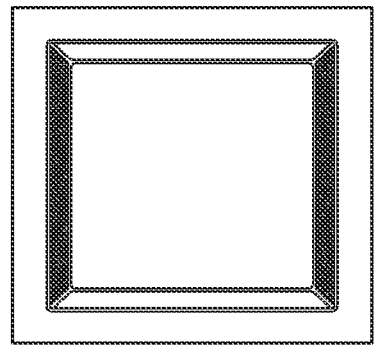
Figure 14:
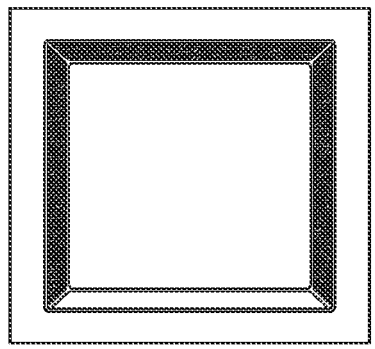
Figure 15:
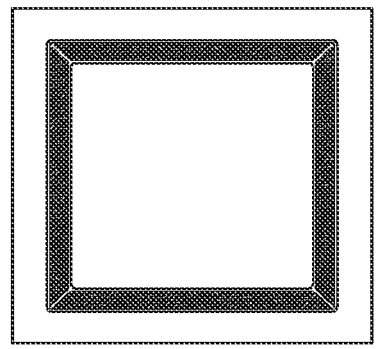
Figure 16:
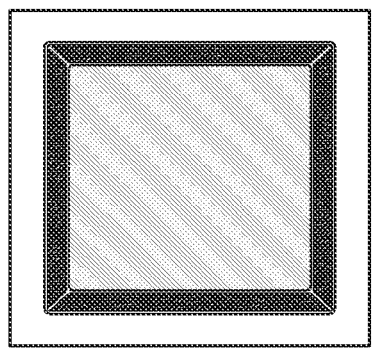
Figure 17:
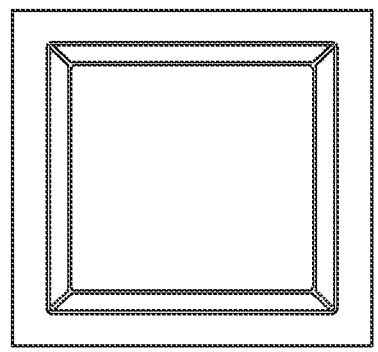

In particular, the chafing dish 100 according to the invention may comprise, as shown in FIG. 11, two openings 108 and 109 accessible from outside also with the cover 107 closed respectively for introducing water 15 into the tray 10, 10' for monitoring, for example through the float, the level of the water 15 introduced therein.

FIGS. 12-17 show a preferred embodiment of the tray 10, 10' according to the present invention. Actually in such configuration which provides for four independent perimeter areas and a central area, six different humidity levels can be identified starting from the configuration with the tray 10, 10' empty, FIG. 17, up to the one in which all the areas are filled with water, FIG. 16.

Figure 18:
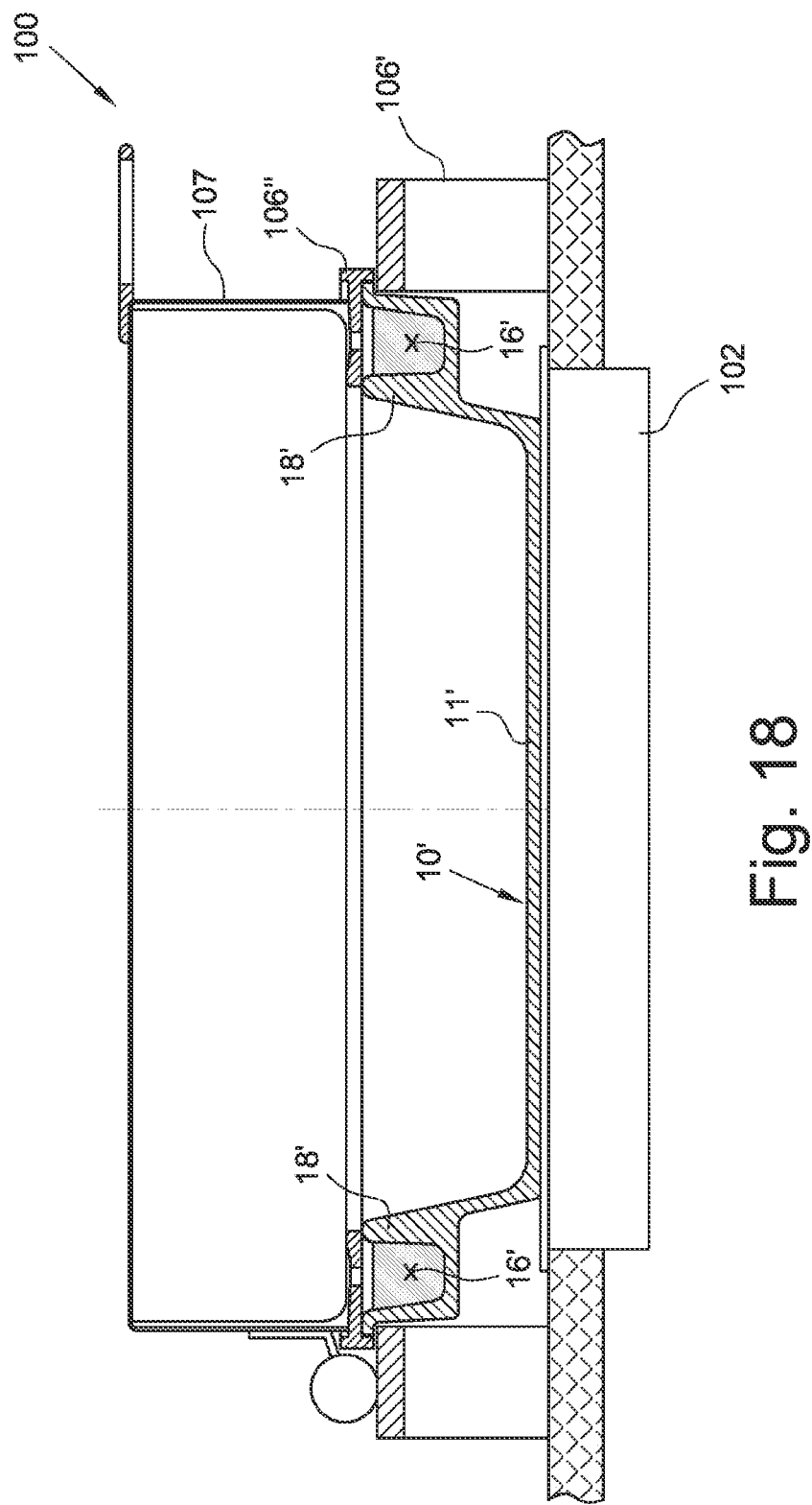
FIGS. 18-19 show two embodiments in which the tray according to the present invention can be directly used as a dish holder tray.
Figure 19:
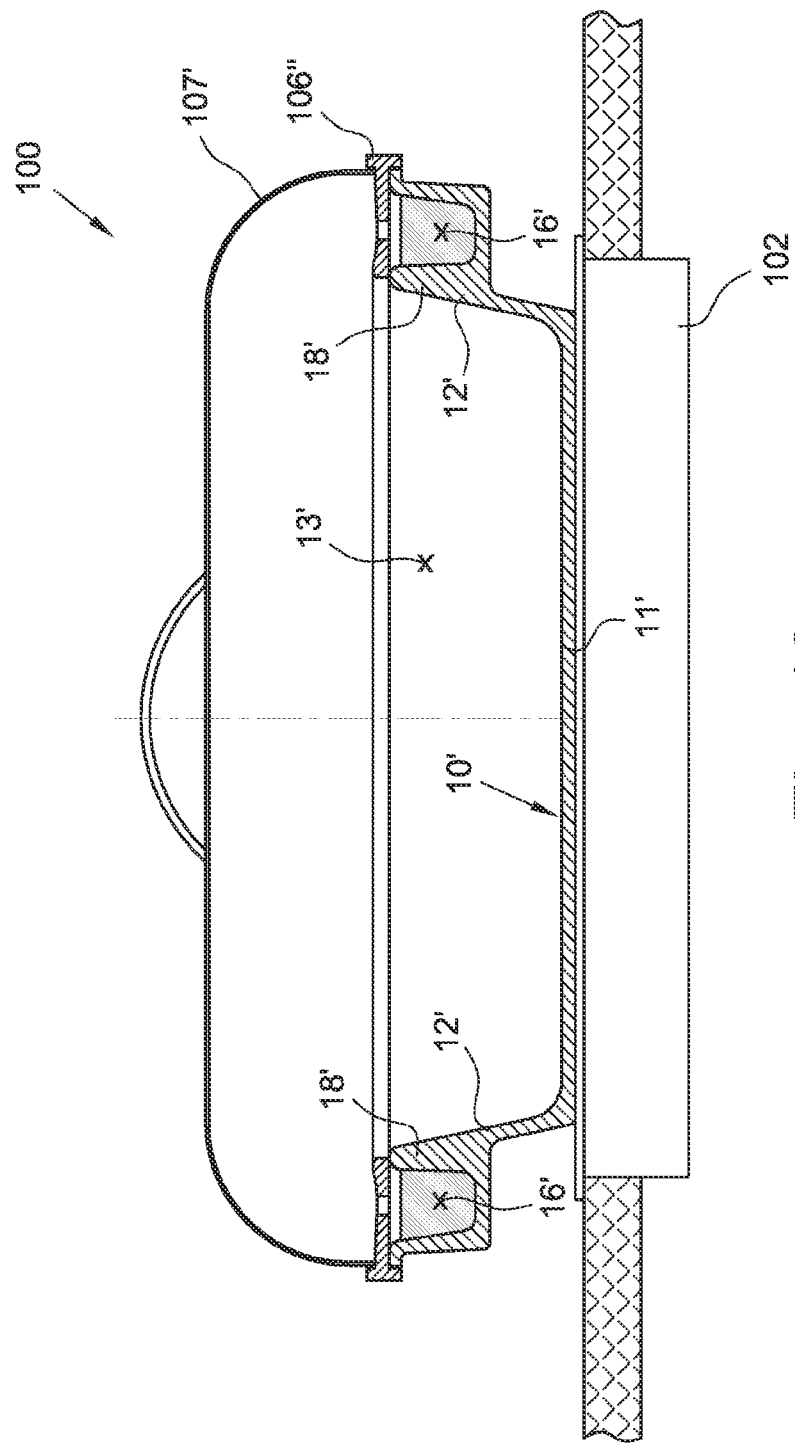

FIGS. 18-19 also show two embodiments in which the tray 10, 10' of the present invention can be directly used as a dish holder tray.

Thus, in such embodiments the chafing dish does not require the presence of further trays given that the aforementioned tray 10, 10' serves as a dish tray 10'. In particular, also in such case following the innovative principle of the invention, the dish tray 10' comprises at least one area 16' for receiving water, usually two or more in form of a channel, independent from the area for depositing the dishes 17'.

The differences between the two embodiments shown in FIGS. 18 and 19 lie in the displacement of the cover 107, 107' and in the possible presence of supports 106'.

In both such embodiments a plane for recovering the moisture 106' is provided which can be associated to the periphery of the tray 10' above the areas 16' for containing water.

It is rather easy to understand the operation of the chafing dish subject of the invention.

The chafing dish 100 of the present invention is provided with a tray 10, 10', which can be used in combination with a further dish tray 104 but also in absence of the latter, which comprises at least two areas 16, 16', 17 for containing water 15 which can be selectively filled and obtained on the base 11 towards the upper opening 13.

Thus, this allows for selectively carrying out a high humidity warming, should both at least two areas 16, 16', 17 be filled with water 15, a warming at controlled humidity, should at least one of the at least two areas 16, 16', 17 be without water 15, and a dry warming, should both the at least two areas 16, 16', 17 be not provided with water 15.

It has thus been observed that the chafing dish, provided with the tray according to the present invention attains the previously outlined objects.

Actually, such chafing dish allows, without removing or replacing any components, to selectively warm the dishes in "bain-marie", i.e. in a high humidity environment, in a controlled humidity environment or in a low humidity environment, with the aim of being able to provide dishes with taste and consistency corresponding to those required by consumers.

The chafing dish thus conceived can be subjected to numerous modifications and variants, all falling within the same inventive concept; furthermore, all details can be replaced by technically equivalent elements. In practice, the materials used, as well as the dimensions thereof, may vary depending on the technical requirements.

The invention claimed is:

1. Tray (10, 10') for a chafing dish (100) of the type comprising a base (11, 11') for coupling to a heat source (101, 102, 103), side containment walls (12, 12') and an upper opening (13, 13') for directly receiving dishes or a further dish tray (104), characterized in that said tray (10, 10') comprises at least two independent areas (16, 16', 17) for containing water (15) which can be selectively filled so as to selectively allow for a high humidity warming, should both said at least two areas (16, 16', 17) be filled with water (15), a controlled humidity warming, should at least one of said at least two areas (16, 16', 17) be not provided with water (15), and a dry warming, should both said at least two areas (16, 16', 17) be not provided with water (15) and comprises an opening (108) that is also accessible with a cover (107, 107') closed, for introducing water (15) into said tray (10, 10').

2. Tray (10, 10') according to claim 1 characterized in that said at least two areas (16, 16', 17) for containing water (15) are delimited by barrier elements (18, 18').

3. Tray (10, 10') according to claim 1 characterized in that it comprises peripheral extensions (19) substantially orthogonal to said side walls (12) for coupling to a support structure of said chafing dish (100).

4. Tray (10, 10') according to claim 1 characterized in that said base (11) is provided with means (20) for coupling to said heat source (101, 102, 103) obtained towards the outside of said tray (10).

5. Chafing dish (100) of the type comprising a closing cover (107, 107'), a tray (10, 10') according to claim 1 and a heat source (101, 102, 103), said tray (10, 10') being on one side coupled to said heat source (101, 102, 103) and on the other side faced to said closing cover (107, 107') for directly receiving dishes or a further dish tray (104).

6. Chafing dish (100) according to claim 5 characterized in that it comprises a dish tray (104), at least partly inserted in said tray (10, 10').

7. Chafing dish (100) according to claim 6 characterized in that it comprises a connection element (105) between said dish tray (104) and said tray (10) shaped so as to convey possible condensed steam towards said tray (10).

8. Chafing dish (100) according to claim 5 characterized in that it comprises a spacer element(106') for keeping said dish tray (10, 10') in a suspended position.

9. Chafing dish (100) according to claim 1 characterized in that it comprises a second opening (109) also accessible with a cover (107, 107') closed for monitoring, through the float, the level (15) of the water introduced into said tray (10, 10').

* * * * *